Jan. 21, 1964
A. E. ENGELHARDT
3,118,695
SHAFT CLAMPING DEVICES
Filed April 25, 1960
2 Sheets-Sheet 1
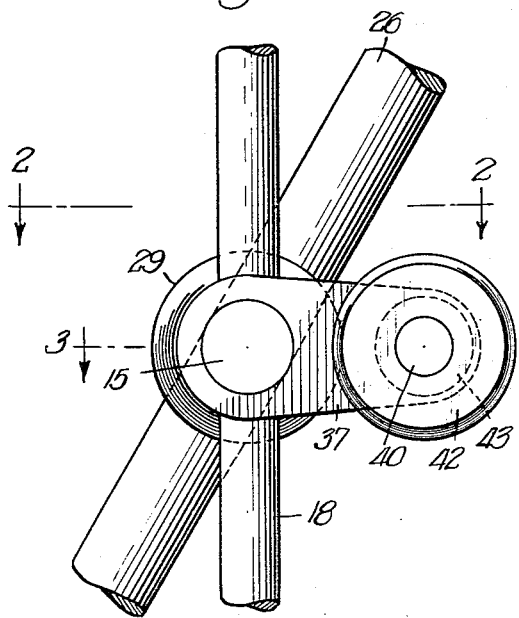
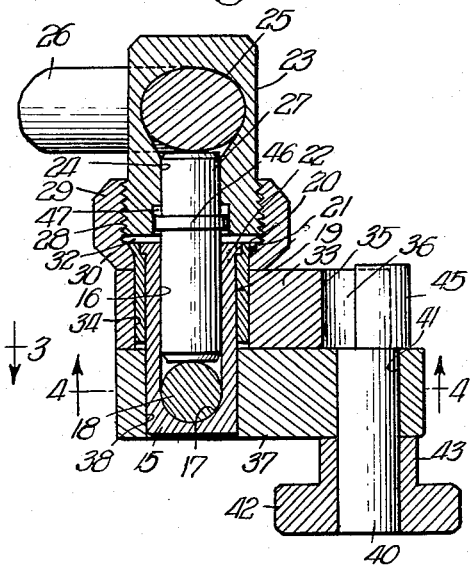
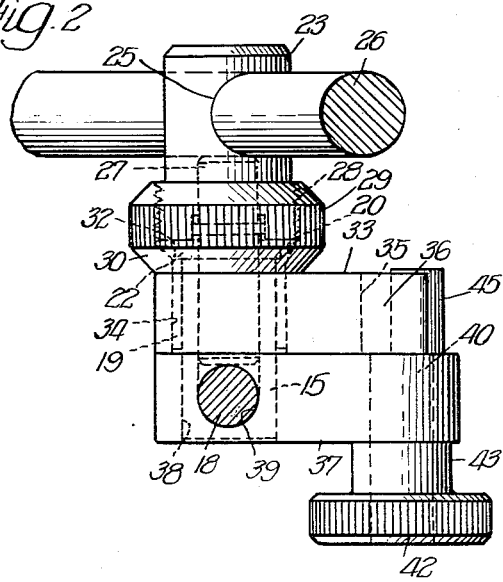
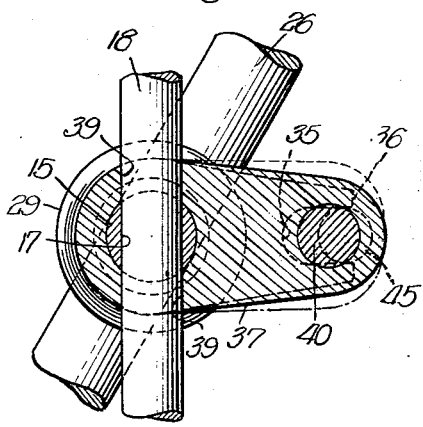
INVENTOR.
Armin E. Engelhardt,
BY
attý

Jan. 21, 1964 A. E. ENGELHARDT 3,118,695
SHAFT CLAMPING DEVICES
Filed April 25, 1960 2 Sheets-Sheet 2
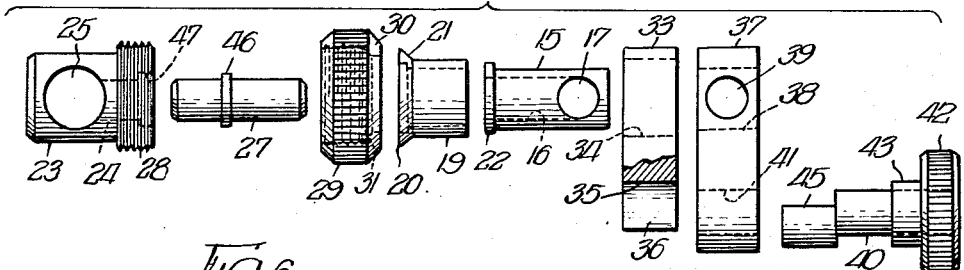
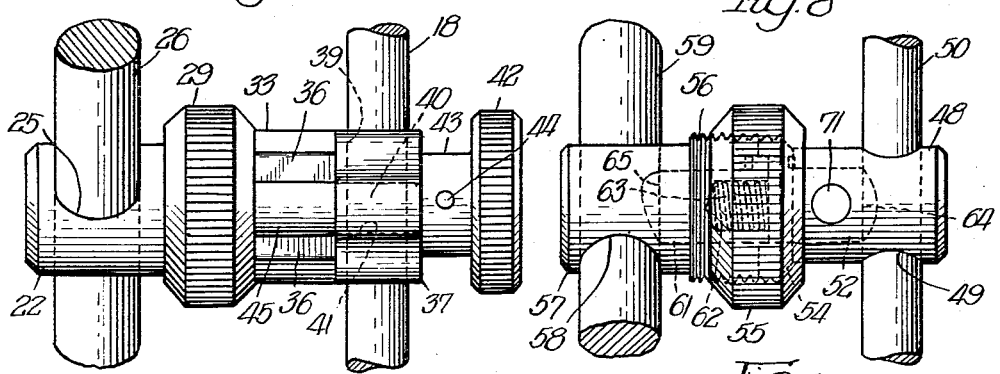
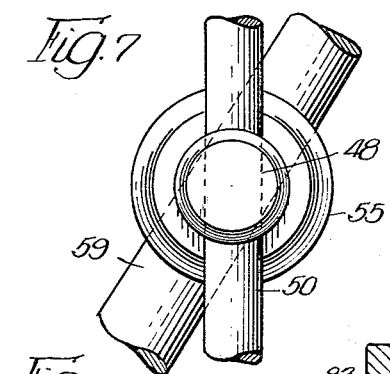
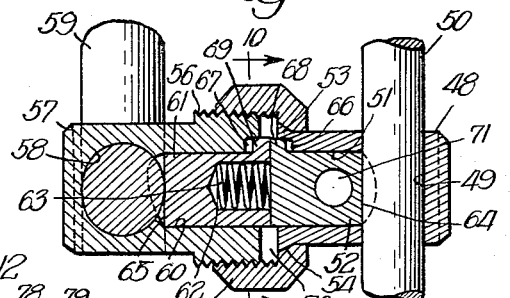
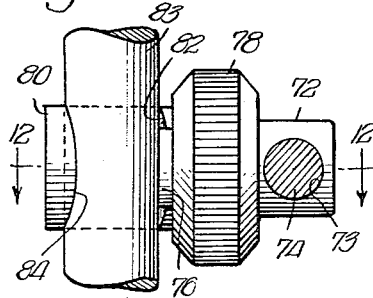
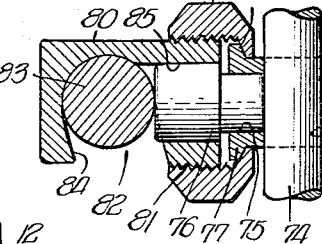
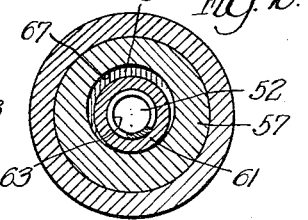
INVENTOR.
Armin E. Engelhardt,
BY
B. Pelechowicz
Atty.

US United States Patent Office 3,118,695
Patented Jan. 21, 1964

3,118,695
SHAFT CLAMPING DEVICES
Armin E. Engelhardt, 610 McLean St., Bensenville, Ill.
Filed Apr. 25, 1960, Ser. No. 24,319
10 Claims. (Cl. 287—54)

The present invention relates to shaft clamping devices of the general type disclosed in my Patent 2,696,996 and in my co-pending application, Serial No. 713,193, now Patent 2,940,789, date June 14, 1960.

The principal object of the present invention is the provision of a shaft retaining member, including a pair of tubular elements arranged in an end-to-end relation, each of which is provided with a transverse bore for reception therewithin of a shaft, a pin receivable within said tubular elements, and means for selectively shifting said tubular members to or away from each other, said pin by its ends being capable of entering the transverse bores when said tubular elements are drawn towards each other for thereby coming in a strong frictional abutment with the shafts reposing within said bores for thereby gripping the shafts with the shaft retaining member and maintaining them in a longitudinal adjustment within the shaft retaining member as well as in a mutual angular adjustment, the two tubular elements being capable of rotary shifting movement for thereby adjusting the mutual angular relation of the two shafts.

Another object of the present invention is the provision in a clamping device of the type hereinabove indicated of a shaft retaining member, including a pair of tubular elements arranged in an end-to-end relation, and having a rotatable member freely connected with one of said tubular elements in a swivelled relation, and threadedly engageable with the other of said tubular elements, whereby said tubular elements may be capable of a longitudinal shifting movement towards or away from each other, depending upon the direction to which said rotatable member is turned, for thereby causing the said pin to selectively shift by its ends into or out of said bores so as to selectively interengage the shafts located within the said bores with a strong frictional abutment by its ends with the shafts and hold them with the shaft retaining member or to free them from their gripped engagement with the shaft retaining member.

A further object of the present invention is the provision of the swivelled connection between the said rotatable member and one of the said tubular elements, thereby permitting angular mutual adjustment of the two shafts when manual pressure is made to bear thereagainst, with means therein provided for finer angular adjustment of the shafts, in either direction, and beyond the degree of the angular adjustment of the shafts brought about by the manual pressure exerted thereagainst.

A still further object of the present invention is to generally improve or to simplify the construction of the shaft clamping devices disclosed in my said patents, it being understood that whenever applicable the objects specified in the said patents apply with equal force to the device disclosed in the instant application.

With the above general objects in view and others that will appear as the invention is better understood, the same consists in the novel construction, combination and arrangement of parts hereinafter more fully described, illustrated in the accompanying drawings and pointed out in the appended claims.

In the drawings forming a part of this application and in which like designating characters refer to corresponding parts throughout the several views:

FIG. 1 shows an end elevational view of the present device, with a pair of shafts in a side elevation, while in an angularly adjusted relation by means of the present device;

FIG. 2 is a side elevational view of the present clamping device, taken upon the plane indicated by lines 2—2 of FIG. 1;

FIG. 3 is a longitudinal cross sectional view through the clamping device, taken on line 3—3 of FIG. 1;

FIG. 4 is a cross section on line 4—4 of FIG. 3;

FIG. 5 is an exploded view of the several parts, which, when operatively assembled make up the clamping device of the type hereinabove indicated;

FIG. 6 is an elevational view of the clamping device, taken at substantially 90 degrees from that of FIG. 2;

FIG. 7 is an end elevational view of a modified clamping device, with a pair of shafts in an angular adjusted relation;

FIG. 8 is a side elevational view of a modification of the shaft clamping device shown in FIG. 7;

FIG. 9 is a longitudinal cross sectional view of the modification shown in FIG. 8;

FIG. 10 is a cross sectional view on line 10—10 of FIG. 9;

FIG. 11 is a side elevational view of another modification of the shaft clamping device; and FIG. 12 is a cross sectional view on line 12—12 of FIG. 11.

Referring now to the present drawings, the preferred form of the clamp, illustrated in FIGS. 1 to 6, there is shown a cylindrical or tubular element 15, which, adjacent its inner end is provided with a concentric bore 16, which opens upon the inner end of said element 15, and communicates with a transverse opening 17 for reception therewithin of one shaft 18, in a transverse relation with said cylindrical element 15. Mounted upon the adjacent inner end of said cylindrical element 15 is sleeve 19, the inner end of which is provided with an outwardly diverging flange 20, the external surface of which defines a bevelled wall 21. The inner end of said sleeve 19, adjacent the inner periphery thereof is provided with an annular groove for reception therewithin of a correspondingly shaped annular flange 22, integrally formed with and laterally extending from the inner end of said cylindrical element 15.

Cooperating with said cylindrical element 15 is another cylindrical element 23, which, adjacent its inner end is provided with a concentric bore 24, which is in a longitudinal alinement with the longitudinal bore 16 in the cylindrical element 15. Adjacent its outer end said cylindrical element 23 is provided with a cylindrical opening 25, in a transverse relation with said cylindrical element 23, for reception therewithin of shaft 26.

The clamp further includes pin 27 of a diameter corresponding to the diameters of bores 16 and 24, and remains in a floating relation with said cylindrical members 15 and 23, that is, it is capable of a longitudinal shifting movement within and with respect to both of said cylindrical members 15 and 23, permitting the ends of said pin 27 to shift in or out of the respective openings 17 and 25, for selectively coming into or out of a strong frictional abutment by its ends with the respective shafts 18 and 26, in a transverse relation with the latter when the same remain within the respective openings 17 and 25.

The inner end of said cylindrical element 23 is externally threaded, as at 28, to be engaged by the internal threads made upon the inner periphery, and adjacent one end of nut 29. The opposite end of said nut 29 defines a constricted mouth 30, through which the adjacent inner end of said sleeve 19 is extended. Upon the inner periphery of said nut 29, adjacent said mouth 30, there is a bevelled surface 31 (FIG. 5), which, in the operative position of said nut 29 with relation to the two cylindrical elements 15 and 23, contacts with the bevelled wall 21 of flange 20, as seen in FIG. 3. The internal threads made in said nut 29 do not affect nor overlap said bevelled surface 31, so that in the operative position of said nut 29 with relation to the two cylindrical elements 15 and 23 said nut 29 is in a swivelled relation with sleeve 19, and through the latter, with the inner end of the cylindrical element 15. Taking therefore the invention as defining an operative shaft clamping device by virtue of the parts already described and their cooperation and interengagement pointed out, it will be seen that one end of nut is swivelly connected with the inner end of the cylindrical element 15, through the bevelled wall 21 in flange 20, as the former contacts with the correspondingly bevelled surface 31 made in mouth 30 of nut 29. By virtue of this arrangement nut 29 is capable of a rotary shifting movement in both directions, but is incapable of being disconnected from the said cylindrical element 15 in the direction of flange 20.

Thus, the bevelled wall 21 of flange 20, while contacting with the correspondingly bevelled surface 31 in the constricted mouth 30 of nut 29 defines a swivelled connection for nut 29 with the adjacent inner end of the cylindrical element 15. Turning nut 29 in either direction will cause the inner threads of said nut 29 to ride upon the engaged threads 28 made externally upon the adjacent inner end of cylindrical element 23 for the purpose of selectively shifting said cylindrical element 23 towards or away from the adjacent end of said cylindrical elements 15, depending upon the direction of turning of nut 29.

As is obvious, due to the floating position of pin 27 within the respective bores 16 and 24 of cylindrical elements 15 and 23, pin 27 will be driven by its ends within openings 17 and 25, respectively, to come into a strong frictional abutment with the respective shafts 18 and 26 within the said openings, for thereby interlocking the two shafts with the shaft retaining member, including the said cylindrical elements 15 and 23, when said nut 29 is turned into one direction. On the other hand, when said nut 29 is turned to the opposite direction the cylindrical element 23 will be caused to shift away from cylindrical element 15, thereby freeing the abutting engagement of the ends of pin 27 with the two shafts, permitting longitudinal adjustments of the two shafts within their openings 17 and 25.

It is of course preferable that the inner ends of the two cylindrical elements 15 and 23 should remain in a spaced relation by their inner ends, to effect space 32, thereby conditioning the ends of pin 27 to enter openings 17 and 25 to a greater depth, thereby conditioning the shaft retaining member for reception of shafts of varying diameters.

As is obvious, when due to the operation of nut 29 at least initial frictional engagement of shafts 18 and 26 has been brought about, application of manual pressure against one or both of said shafts will cause a mutual angular turning of the shafts, one with respect to the other, until the two shafts have been brought to a desired mutual angular adjustment. The angular turning of the shafts by manual pressure thereagainst is facilitated due to riding of the bevelled wall 21 upon the corresponding bevelled surface 31 of nut 29. When a desired angular adjustment of the two shafts due to the manual pressure thereagainst has been brought about, further turning of nut 29 is possible in order to shift cylindrical element 23 towards the cylindrical element 15, the bevelled wall 21 and the bevelled surface 31 not militating against such further turning of nut 29, until no further turning of nut 29 is possible, indicating the maximum abutting pressure by pin 27 against the two shafts.

However, notwithstanding the impossibility of further angular adjustment of the two shafts by manual bearing thereagainst due to the maximum bearing force of pin 27 effected against the shafts by turning said nut 29, it is still possible to bring about a finer angular adjustment of the two shafts by bodily turning one of the shafts with relation to the other, in either direction.

The mechanism for the finer adjustment of the two shafts includes arm 33, provided at one of its ends with bore 34, within which sleeve 19 is receivable in a strong frictional relation with said arm 33. Made in the opposite end of said arm 33 is a substantially U-shaped recess 35 for effecting a pair of jaws 36.

Co-acting with said arm 33 is lever 37, which, adjacent one of its ends is provided with bore 38 for reception therewithin in frictional engagement of the outer, free end of cylindrical element 15. The said end of lever 37 is further provided with transverse openings 39 which are in alinement with opening 17. Normally, shaft 18 is passed through said openings 17 and 39 for thereby interconnecting said lever 37 with said cylindrical element 15, as best shown in FIG. 4.

To angularly turn lever 37 with respect to arm 33, in either direction, as is indicated by dotted lines in FIG. 4, in order to bodily angularly shift shaft 18 with relation to shaft 26, a camming mechanism is provided at the opposite end of said lever 37 to cooperate with the adjacent end of arm 33 to accomplish the indicated purpose. The said camming mechanism includes a cylindrical shaft 40 extended by one end through bore 41, for free rotary movement therewithin. The end of said shaft 40 which extends past the free face of said lever 37 receives in a strong frictional engagement knob 42 including collar 43 in a rigid association with said knob 42. To bring about a more positive interengagement of said knob 42 with the adjacent end of shaft 40 pin 44, shown in FIG. 6, may be extended through said collar 43 and shaft 40 in a transverse relation.

Integrally formed with the opposite end of said shaft 40 is an eccentrically located cylindrical cam 45 which enters recess 35, made in arm 33, as is best shown in FIGS. 3 and 6. The diameter of cam 45 corresponds to the width of recess 35, or, putting it in other words, to the distance between the inner faces of jaws 36.

One of the neutral positions of cam 45 is shown in FIGS. 2, 3 and 4. In that neutral position the rise portion of the cam, which is crescent-shaped relative to the transverse plane through shaft 40, as seen in FIG. 4, is located squarely between the free ends of jaws 36.

The second neutral position of cam 45 is effected when the cam by its rise portion is brought to the nearest proximity of the bottom of recess 35, which latter position is at 180 degrees from its first neutral position described in the last preceding paragraph.

The intermediate positions between the two neutral positions of the cam hereinabove described when the cam is turned in either direction due to the rotary movement imparted to shaft 40 by operation of knob 42 are the operative positions of the cam when the latter by its rise is made to bear against one or the opposite jaw 36. There is a great range of operative positional relations of the cam with respect to one or the opposite jaw 36, depending to the extent and the direction to which the cam is made to turn by imparting rotary movement to shaft 40. The maximum degree of operative turning of the cam, and the consequent maximum angular turning of lever 37 with respect to arm 33, as indicated by dotted lines in FIG. 4, is when the peak of the cam's rise is squarely in contact with one or the other jaw 36. The contactual points by the cam's peaks of its rise with the opposite faces of the two jaws 36 are on a line perpendicular to the two neutral positions of the cam's rise hereinabove described.

From the hereinabove description it will therefore be seen that the degree of the angular shifting movement of lever 37 with relation to arm 33 is determined by the extent to which cam 45 by its rise portion is turned to one or the opposite direction to bear against one or the opposite jaw 36. The contactual point of the cam's rise with the given jaw 36, related to the thickness of the cam's rise at that point, will determine the degree of angular turning of lever 37 with relation to arm 33. The maximum degree of the angular turning of lever 37 relative to arm 33, to one or the opposite direction, will come about when the cam's rise at its peak or at its greatest width comes squarely in contact with one or the opposite jaw 36.

Assuming that arm 33 is immovable relative to sleeve 19, due to the exceedingly strong frictional interengagement between said arm 33 and sleeve 19, and sleeve 19 is in an exceedingly strong frictional engagement with nut 29, through the friction engendered between the bevelled wall 21 of flange 20 and the bevelled surface 31 formed within the constricted mouth 30, and further bearing in mind that nut 29 has reached the maximum capacity of manual rotary turning so as to further shift the cylindrical element 15 toward the cylindrical element 15, due to the bar of pin 27 as it bears by its ends against shafts 18 and 26, so that under the conditions specified the possibility of manual pressure imparted in lateral direction against shafts 18 and 26 with the intended purpose of bringing a finer angular adjustment of the two shafts is eliminated, that the cam mechanism aforesaid comes into play for the purpose of angularly shifting lever 37 with relation to arm 33, in one or the opposite direction, for the purpose of bodily shifting shaft 18 to one or the opposite direction in order to bring about finer angular adjustment of shaft 18 with relation to shaft 26. In order to bring about proper operation of the cam mechanism, without disturbing the positional stationary relation of arm 33 with respect to the clamping device, while at the same time angularly turning of lever 37 and with it bodily shifting of shaft 18 in either direction so as to bring about a finer angular adjustment of said shaft 18 with relation to shaft 26, it is noted that, although there may be, there need be no frictional contact between the adjacent contacting peripheries of sleeve 19 and cylindrical element 15. Angular shifting of lever 37 with relation to arm 33 needs only to overcome the frictional contact of flange 22 and the body portion of the upper end of sleeve 19 adjacent the groove made therein within which said flange 22 reposes.

What actually needs to be overcome is the frictional interengagement of the underface of flange 22 with the contacting seat in sleeve 19, upon which said flange 22 rests, because the peripheral surface of flange 22 need not be in any great contactual relation with the adjacent lateral body portion of sleeve 19. Since the area of the underface of flange 22, bearing upon the adjacent seating surface in sleeve 19, is much smaller than the area of the bevelled wall 21 in flange 20, as the latter bears against the bevelled surface 31 in the constricted mouth 30 of nut 29, it therefore follows that the bearing force of cam 48 against one or the other jaw 36 will be incapable of angularly moving arm 33, but will be able through the cam's connection with shaft 40 to move lever 37 in the direction opposite of that to which the cam rise bears against one or the opposite jaw 36.

The frictional engagement of the adjacent end of pin 27 with the peripheral point of shaft 18, added to that of the underface of flange 22 with the surface of sleeve 19 upon which the former is seated, will not militate against the greater degree of frictional engagement of the bevels 21 and 31, or against the angular shifting movement of shaft 18 in either direction brought about by the operation of the cam mechanism aforesaid.

To assemble the several parts of the cam mechanism, assuming that arm 33 has first been forced in a frictional engagement with sleeve 19, first, the free end of shaft 40 is extended through bore 41 in lever 37, and then cam 45 is manipulated until the cam enters recess 35. Finally knob 42 and collar 43 are brought in engagement with the free end of shaft 40. During these operations the clamping device is maintained in its disassembled condition. The next step is to insert the end of the cylindrical element 15 into bore 38, having first extended the same through sleeve 19. Then shaft 18 is extended through openings 17 and 39, and thereupon the remaining parts are assembled in an operative relation shown in FIGS. 2 and 3.

Integrally formed collar 46 in an encompassing relation with pin 27 normally reposing within annular groove 47, merely acts as a guide for pin 27, for alternately coming in contact with the body portion of cylindrical element 23 adjacent the bottom of groove 47, or to fall in contact with the upper end of cylindrical element 15, when nut 29 is loosened upon said cylindrical element 23, thereby preventing said pin 27 from falling too far into opening 25 or opening 17, as the case may be, thereby facilitating the insertion of shafts within the said openings.

In the practical application of the present clamping device, one of the two shafts may be used as a support both for the clamping device and for the remaining shaft. When the remaining shaft is intended to support various instruments of precision, such as disclosed in my said patents, it is often necessary that the angular positional relation of one shaft with respect to the other be adjusted with the greatest degree of precision. This accounts for the mechanism for finer adjustment of angular positional relation of the two shafts, as hereinabove described, including arm 33, which, through the medium of jaws 36, acts as a fulcrum for cam 45, whereby lever 37 may be angularly shifted in either direction for the purpose of angularly shifting shaft 18 in either direction so as to bring about a finer positional angular adjustment with relation to shaft 26, which could not be otherwise accomplishd either through operation of nut 29 or manual pressure applied against the two shafts.

Although each of the two modifications, illustrated in FIGS. 7 to 12, embody the basic structure employed in the preferred form of the invention, heretofore described, the former differs somewhat in details which will be presently described.

In the first modification shown in FIGS. 7 to 10 the cylindrical element 48 is provided with a transverse opening 49 for reception therewithin of shaft 50. Made in the element 48 in a concentric relation is bore 51, communicating with said opening 49, said bore 51 opening on the inner end of said cylindrical element 48, for reception therewithin of pin member 52.

The inner end of said cylindrical element 48 is provided with a lateral outwardly flaring flange 53, the beveled wall of which contacts the beveled surface 54 made upon the inner periphery of the adjacent constricted mouth of nut 55. By virtue of this arrangement said flange 53, including its beveled wall, in conjunction with the correspondingly beveled surface 54 made in the adjacent end of said nut 55, defines a swivelled connecting joint between said cylindrical element 48 and nut 55, permitting the latter to turn around said cylindrical element 48 but preventing the disconnection of said nut 55 from said cylindrical element 48 in the direction away from the outer free end of said cylindrical element 48. The remaining portion of the inner periphery of nut 55, towards and adjacent the opposite end of said nut 55 is internally threaded for engaging threads 56 made externally of and adjacent the inner end of cylindrical element 57. Said latter cylindrical element 57, adjacent its outer free end is provided with a transverse bore 58 for reception therewithin of shaft 59. Made within the inner end of said cylindrical element 57, in a longitudinally concentric relation, is bore 60 for reception therewithin, through the inner end thereof, of pin member 61. Formed in the inner end of said pin member 61, in a concentric relation, is socket 62, opening upon the inner end of said pin member 61, for reception of coil spring 63 capable of contraction within said socket 62 for normally exerting tensioned pressure upon the inner end of said pin member 52.

The outer end of each pin member 52 and 61 is provided with a transverse, trough-like, concaved recess 64 and 65, respectively. The arcs of the body portions of the outer ends of said pin members 52 and 61 on transverse planes made through said recesses 64 and 65, are complementary of the arcs of bores 49 and 58, and therefore complementary of the peripheries of shafts 50 and 59 respectively, so that normally in the operative positions of said shafts 50 and 59 within the bores 49 and 58, respectively, the peripheral portions of said shafts 50 and 59 fill out said recesses 64 and 65, respectively, as is indicated in FIGS. 8 and 9.

In order to facilitate insertion of shafts 50 and 59 within their respective bores 49 and 58, prior to turning nut 55 in order that the outer ends of pin members 52 and 61 may exert pressure upon the respective shafts 50 and 59 for clamping the latter in their mutual longitudinal and angular adjusted positions, it is desirable that said recesses 64 and 65 may at all times maintain a longitudinal position with relation to the respective bores 49 and 58. The means to accomplish that purpose includes crescent-shaped recesses 66 and 67, made in the inner ends of cylindrical elements 48 and 57, respectively. By their outer ends said recesses 66 and 67 open upon the inner ends of the respective cylindrical elements 48 and 57, as seen in FIG. 9. Receivable within said crescent-shaped recesses 66 and 67 are crescent-shaped flanges 68 and 69, respectively, which are integrally formed with and laterally extending from the inner ends of pin members 52 and 61, respectively. The outer transverse faces of said crescent-shaped flanges 68 and 69 remain flush with the ends of the respective pin members 52 and 61, as seen in FIG. 9. Due to the eccentric positional location of said crescent-shaped recesses 66 and 67 with relation to the respective cylindrical elements 48 and 57, and a like positional relation of said crescent-shaped flanges 68 and 69 with respect to their pin members 52 and 61, as seen in FIG. 10, the function of said flanges 68 and 69 is the interlocking of the said pin members 52 and 61 with their respective cylindrical elements 48 and 57 on transverse planes, when said flanges 68 and 69 remain within their respective recesses 66 and 67, for thereby preventing rotary movement of said pin members 52 and 61 with relation to and independently of their respective cylindrical elements 48 and 57. In brief, the crescent-shaped recesses 66 and 67 function as keyways, and the said crescent-shaped flanges 68 and 69 as keys, for interlocking pin members 52 and 61 with their respective cylindrical elements 48 and 57. While forming of said recesses 66 and 67 and of said flanges 68 and 69 into the shapes of crescents is facilitated during the machining processes, obviously the keys may be made in the shape of lugs, blocks, or the like, in a radial relation with their respective pin members 52 and 61, with the keyways correspondingly shaped in a radial relation with the said pin members.

The respective keyways 66 and 67 and the respective keys 68 and 69 are so related to the respective recesses 64 and 65 as to maintain the latter and the resulting skirt body portions of the outer ends of pin members 52 and 61 in a longitudinal relation with the respective bores 49 and 58 for thereby facilitating insertion and extension therethrough of shafts 50 and 59, respectively.

It is of course not an absolute prerequisite that the arcs in the outer ends of pin members 52 and 61 resulting from recesses 64 and 65 be under all conditions complementary of the arcs of bores 49 and 58, respectively. If the diameters of shafts 50 and 59 substantially correspond to the diameters of the respective bores 49 and 58 within which the said shafts are receivable, then it does not matter as to whether or not the outer ends of pin members 52 and 61 are provided with arcuate recesses, because under those conditions even blunt ends, such as in pin 27 in the preferred form of the clamp, will give satisfactory result by engendering pressure upon the shafts to maintain the latter in their longitudinally adjusted relation with cylindrical elements 48 and 57.

If, however, the diameter of a given shaft 50 or 59 is smaller than the diameters of the respective bores 49 or 58, then it is preferable that the arc resulting from the given recess 64 or 65 should correspond to the peripheral arc of the given shaft 50 or 59, in order that the body portion of the given pin member 52 or 61 should come in an intimate contactual engagement with the periphery of the given shaft. However, even if the arc formed by the recess is upon a circle of a diameter smaller than the diameter of a given shaft so that the latter is incapable of fully entering the recess in order to fill the same and to bring about an intimate contact between the arcuate body portion in the pin member so as to effect an intimate contact with the shaft periphery, such a condition would still give a reasonably satisfactory result due to the fact that the free edges of the skirt portions resulting from the recess would still come in an abutting contact at two transversely spaced points of the shaft to exert pressure thereagainst in the direction of the outer free end of a given cylindrical element for maintaining the shaft in a clamped position.

From what has been said it will therefore be apparent that pin members 52 and 61 provided at their outer ends with recesses, such as 64 and 65, but having varying degrees of arcuity may be interchangeably employed with the respective cylindrical elements 48 and 57, in conformity with the varying peripheral arcs of one or the other shaft 50 or 59. So as to provide sufficient degree of play in the longitudinal shifting movement of pin members 52 and 61, especially when the pin members of varying degree of arcuity at recesses 64 and 65 are employed, and consequently when it is desirable to condition the outer ends of pin members 52 and 61 to enter bores 49 and 58 to a greater or lesser extent, in conformity with the decreased diameter of the given shaft 50 or 59, crescent-shaped recesses 66 and 67 should be of a depth greater than the thickness of flanges 68 and 69 to afford such a play for the purpose specified. This condition is clearly indicated in FIG. 9.

The contacting bevelled wall of flange 53 with the bevelled surface 54 of the constricted mouth of nut 55 affords a swivelled connecting joint between cylindrical element 48 and nut 55, whereby nut 55 is permitted to turn around said cylindrical element 48 but is prevented from being disconnected therefrom in the direction away from shaft 50. As is obvious nut 55 is insertable over said cylindrical element 48 from the free end of the latter prior to the insertion of shaft 50 within bore 49.

As nut 55 is rotatably turned to one direction it engages threads 56 for drawing the inner ends of cylindrical elements 48 and 57, and the inner ends of their respective pin members 52 and 61, towards each other. When the inner ends of said pin members 52 and 61 are brought in contact the outer ends thereof will come in a strong frictional abutment, by their recessed body portions, with shafts 50 and 59 in order to effect a firm clamped interconnection of the shafts in their longitudinal and mutually angular adjusted positions with the cylindrical members 48 and 57.

The cylindrical elements 48 and 57 in their length, should be related to the varying diameters of shafts 50 and 59, and consequently to the extent of the shifting movement of the outer ends of pin members 52 and 61 by their recesses 64 and 65 into bores 49 and 58 to bring the said outer ends of said pins into clamping relation with the shafts of varying degrees. Therefore, in the maximum clamping position of cylindrical elements 48 and 57, as related to the shaft or shafts of the predeterminately smallest diameter or diameters intended for clamping by the present device, the inner ends of cylindrical elements 48 and 57 when in a clamping position should not meet but should be spaced as at 70 in FIG. 9.

Once the inner ends of cylindrical elements 48 and 57 come in a mutual abutment, no further shifting of the said elements towards each other is possible, and consequently no further extension of the outer ends of pin members 52 and 61 in a clamping relation of the shafts would be possible. For the same purpose space 32 between the cylindrical elements 15 and 23 as related to the pin 27 in the preferred form of the invention (FIG. 3) is afforded. Obviously, due to the action of cylindrical elements 48 and 57, as the same are being drawn towards each other by nut 55 the inner ends of pin members 52 and 61 must come in a mutual abutting relation, due to the pressure exerted at the outer ends of said pin members by shafts 50 and 59, because necessarily the shafts are being shifted towards each other with the corresponding shifting movement of the said cylindrical elements 48 and 57. This action of the shafts against the outer ends of pin members 52 and 61 is identical with the action of shafts 18 and 26 upon pin 27 in the preferred form of the invention.

The expanding action of coil spring 63 is merely as a temporary expedient to bear against the inner ends of pin members 52 and 61, and thereby temporarily to cause the frictional engagement of the outer ends of the said pin members with the shafts during the initial longitudinal adjustment of the shafts within their bores 49 and 58 and their mutual angular adjustment, thereby preventing falling out of the shafts from within their bores and prior to applying a rotary movement to nut 55 in order to bring about the ultimate clamping effect upon the shafts by said pin members 52 and 61.

The alined openings 71 made in the pin member 52 and the cylindrical element 48 provide an alternative bore for insertion of a shaft of a diameter corresponding to the diameter of said openings 71 or of a diameter reasonably or operatively smaller than the diameter of said openings 71.

If a shaft is inserted within openings 71, to be clamped therewithin due to the shifting movements of pin member 52 and cylindrical element 48 in opposed directions, in that event shaft 50 may be dispensed with. However, if a shaft insertable within openings 71 is of a diameter somewhat smaller than the diameter of said openings 71, in that event pin member 52 may still be capable of shifting to an operative extent against shaft 50, in which case the two shafts may be used in connection with the cylindrical elements 48. Exigencies may arise in some particular arts making it advantageous to employ three shafts to be clamped by the device herein disclosed. Of course, openings 71 need not be at a right angle to bore 49, as shown in FIGS. 8 and 9, but the same may be in a diagonal relation with bore 49 and at such angle with relation thereto as the particular exigency may dictate.

The basic elements employed in the two forms of the device already described are carried to the second modification illustrated in FIGS. 11 and 12. There, cylindrical shaft retaining element 72 is provided with a transverse bore 73 for reception therewithin of shaft 74. The inner end of said shaft retaining element 72 is provided with a communicating bore 75 for reception therewithin of the narrower end of shaft engaging pin 76. Said bore 75 opens upon bore 73 so that the narrower end of pin 76 extended therethrough may abut shaft 74 in a clamping relation.

The laterally extending flange 77 from the inner end of said shaft retaining element 72 is bevelled to contact with a like bevelled surface made inwardly of the constricted end mouth of nut 78, both as indicated at 79. The inner periphery of nut 78 is provided with threads to engage the external threads made at the adjacent inner end of the other shaft retaining element 80, as at 81. Made adjacent the opposite free end of said shaft retaining member 80 is recess 82.

Said recess 82 opens laterally upon said shaft retaining element 80, for reception and seating therewithin of shaft 83. It is noted that said recess 82 is in an oblique relation with the longitudinal axis of said shaft retaining elements 80 for the purpose of effecting in said shaft retaining element 80, adjacent its outer free end, of an upturned lip 84, which remains upon a plane extended transversely through said shaft retaining element 80 coincidentally with said lip 84, which is removed from the transverse plane extended through said shaft retaining member 80 coincidentally with the seating point of shaft 83 which is upon the longitudinal axis of said retaining element 80 and which is in the nearest proximity of the outer free end of said shaft retaining element 80.

The opposite end of said pin 76 is diametrically enlarged and is extended within the longitudinal bore 85 made through the inner end of said shaft retaining member 80 in a concentric relation. When shafts 74 and 83 remain within bore 73 and recess 82, on turning nut 78 the inner ends of the shaft retaining elements 72 and 80 are caused to shift towards each other for the purpose of extending the narrower end of pin 76 in the direction of bore 73 and in an abutting relation with shaft 74, while the opposite enlarged end of pin 76 is caused to shift within recess 82 and in an abutting relation with shaft 83. It is observed that a portion of the edge defined by the end wall of said enlarged end of pin 76 and its peripheral wall is caused to enter said recess 82 adjacent the mouth thereof for effectively blocking the withdrawal of shaft 83 from its clamped position in recess 82. This condition will continue as long as the two shafts are in a clamped relation with pin 76. It is only when nut 78 is loosened that the enlarged end of pin 76 is capable of withdrawal from its blocking position within recess 82 for thereby permitting the withdrawal of shaft 83 through the mouth of recess 82.

From the hereinabove description it will be apparent that in a clamping position of pin 76 the adjacent end thereof cooperates with the incline at lip 84 to constrict the mouth of recess 82 preventing the withdrawal therethrough of shaft 83.

From a broader aspect of the modified form of invention, illustrated in FIGS. 7 to 10, pin members 52 and 61 function as a single pin 27 in the preferred form of the invention.

While there are described herein preferred embodiments of the present invention, it is nevertheless to be understood that minor changes may be made therein without departing from the spirit and scope of the invention as claimed.

What I claim as new is:

1. A clamping device for clamping a pair of shafts comprising a pair of cylindrical elements, said cylindrical elements being capable to assume an end-to-end position while in an operative relation for thereby defining inner and outer ends, adjacent their outer ends said cylindrical elements each being provided with a transverse opening for reception therewithin of a shaft, adjacent their inner ends said cylindrical elements each being provided with a bore in communication with its respective opening, the two bores being in alinement and in a longitudinal relation with said cylindrical elements, a floating member freely positioned within said bores for a longitudinal shifting movement therewithin, an outwardly flaring flange integrally formed with and laterally extending from the inner end of one of said cylindrical elements, said flange defining a bevelled surface, and an annular member extended over the inner end of said one cylindrical element, said annular member having a constricted mouth adjacent one end thereof for defining an inwardly disposed bevelled surface for tight frictional gripping engagement with the surface of said flange, said bevelled surfaces cooperating to hold said flanged cylindrical element and said annular member together in a tight friction grip, the inner end of the other of said cylindrical elements being externally threaded for engagement by internal threads made adjacent the opposite end of said annular member, due to the threaded interengagement of said annular member with said other cylindrical element, the inner ends of said cylindrical elements being adapted for a shifting movement towards each other for thereby causing shifting of said floating member by its ends towards the shafts reposing within said openings for bringing the former in a frictional abutment with the latter, in the operative position of said annular member with relation to said cylindrical elements the bevelled surfaces in said flange and said annular member defining a swivel connection between said annular member and said one cylindrical element permitting rotary turning of said one cylindrical element and bodily turning of the shaft reposing within the opening of the latter cylindrical element for thereby bringing about a relative angular adjustment of the two shafts.

2. A shaft clamping device comprising a pair of cylindrical elements, said cylindrical elements in their operative position being capable of assuming an end-to-end relation thereby effecting inner and outer ends, a sleeve in an encompassing relation with one of said cylindrical elements adjacent the inner end thereof, an annular member, a swivelled connection between said sleeve and said annular member, a threaded connection between said annular member and the other of said cylindrical elements, an annular flange laterally extending from said one cylindrical element adjacent the inner end thereof, said flange being seated within the adjacent end of said sleeve whereby said one cylindrical element may be capable of a rotary movement with relation to said sleeve, an arm frictionally connected by one of its ends with said sleeve, a lever mounted by one of its ends upon the outer end of said first named cylindrical elements, said other cylindrical element being provided adjacent its outer end with a transverse opening for reception therewithin of a shaft, the outer end of said one cylindrical element and the adjacent end of said lever being provided with transverse alined openings for reception of a shaft therewithin, said cylindrical elements upon their inner ends being provided with alined bores, the outer ends of said bores being in communication with the openings in the outer ends of said cylindrical elements, a pin positioned within and extended through both of said bores, due to the swivelled connection between said annular member and said sleeve said one cylindrical member along with said arm, lever and the shaft interconnected between said one cylindrical element being capable of bodily rotatable swinging motions in either direction for angularly adjusting said last named shaft with relation to the shaft supported by said other cylindrical element, on imparting a rotary movement to said annular member said cylindrical elements being drawn to draw the inner ends of said cylindrical elements towards each other for thereby causing frictional abutment of the ends of said pin with the two shafts for thereby interlocking the two shafts with the respective cylindrical elements and for fixing the angular mutual adjustment of the two shafts, the opposite end of said arm being provided with a longitudinal recess axially disposed with relation with said arm for defining a pair of jaws, a shaft extended through the opposite end of said lever, an eccentric cam carried by one end of said shaft, said cam entering said recess and being in contact with the inner faces of said jaws, and means carried by the opposite end of said last named shaft for imparting a rotary shifting movement thereto in either direction for thereby imparting an angular shifting movement to said lever in either direction for thereby imparting a rotary shifting movement to said one cylindrical element for bringing about a finer angular adjustment of the shaft carried thereby with relation to the other shaft.

3. A shaft clamping device comprising a pair of cylindrical elements, said cylindrical elements in their operative position being capable of assuming an end-to-end relation for thereby effecting inner and outer ends, a sleeve in an encompassing relation with one of said cylindrical elements adjacent the inner end thereof, an annular member, a swivelled connection between said sleeve and said annular member, a threaded connection between said annular member and the inner end of the other of said cylindrical elements, said one cylindrical element being journalled by its inner end within said sleeve, a pin extended through the inner ends of said cylindrical elements, the outer end of each of said cylindrical elements being provided with a transverse opening for reception therewithin of a shaft, on imparting of a rotary shifting movement to said annular member the inner ends of said cylindrical elements being capable of shifting towards each other for thereby shifting the ends of said pin in a frictional abutment by its ends with both of said shafts, an arm frictionally connected by one of its ends with said sleeve, a lever connected by one of its ends with the outer end of said one cylindrical element, and a camming device supported by the opposite end of said lever, the opposite end of said arm defining a fulcrum for said camming device whereby said lever is capable of angular shifting movement in either direction with relation to said arm for thereby imparting a rotary movement of said one cylindrical element within said sleeve for bodily moving the shaft carried by said one cylindrical element for bringing about a finer angular adjustment of said last named shaft with relation to the other shaft.

4. A shaft clamping device comprising a pair of oblong shaft retaining elements, said shaft retaining elements in their operative position being capable of assuming an end-to-end mutual relation, while in that operative position said shaft retaining elements defining inner and outer ends, said shaft retaining elements at their outer ends each being provided with a transverse opening for reception therewithin of a shaft, said shaft retaining elements through their inner ends being provided with alined bores in a longitudinal relation with said shaft retaining elements, the outer ends of said bores communicating with said openings, a pin receivable within said alined bores, an annular member receiving the inner ends of said shaft retaining elements, a bevelled connection between said annular member and the inner end of one of said shaft retaining elements, said bevelled connection holding said annular member and said one of said shaft retaining elements together in a tight friction grip for movement as a unit upon establishment of frictional engagement therebetween, and a threaded connection between said annular member and the inner end of the other of said shaft retaining elements, on imparting rotary shifting movement to said annular member the inner ends of said shaft retaining elements being drawn towards each other for causing the shifting of said pin by its ends in an abutting frictional relation with the shafts for interlocking the same with said shaft retaining elements in a clamped relation.

5. In the structure defined by claim 4, wherein said bevelled connection of said annular member and said one shaft after frictional gripping thereof permitting a rotary shifting movement of one of said shaft retaining elements with relation to the other and without disturbing the operative position of said annular member and the clamped relation of said pin with respect to the two shafts when manual pressure in a lateral direction is imparted to at least one of the shafts for thereby adjusting mutual angular relation of the two shafts.

6. A shaft clamping device comprising a pair of cylindrical shaft retaining elements, said shaft retaining elements in their operative position being capable of assuming an end-to-end mutual relation, while in that operative position said shaft retaining elements defining inner and outer ends, adjacent its outer end one of said shaft retaining elements being provided with a side-opening notch for reception therewithin of a shaft, adjacent its outer end the other of said shaft retaining elements being provided with a transverse recess, the mouth of said recess opening upon the side of said last named shaft retaining element for insertion therethrough of a shaft, through their inner ends said shaft retaining elements being provided with longitudinal alined bores, the bore made in the said first named shaft retaining element being in communication with said notch, the bore made in the other of said shaft retaining elements being in communication with said recess, a pin receivable within said bores in a transverse relation with said opening and said recess, and means for drawing the inner ends of said shaft retaining elements for effecting frictional abutment of the ends of said pin with the shafts extended through said opening and said recess.

7. In the structure defined by claim 6 wherein said means including a swivelled interconnection between the inner ends of said shaft retaining elements permitting relative shifting movement on a transverse plane in either direction of one shaft retaining element with respect to the other for thereby bringing about a mutual angular adjustment of the two shafts.

8. A shaft clamping device comprising a pair of cylindrical shaft retaining elements, said shaft retaining elements in their operative position being capable of assuming an end-to-end mutual relation, while in that operative position said shaft retaining elements defining inner and outer ends, adjacent its outer end one of said shaft retaining elements being provided with a side-opening notch for reception therewithin of a shaft, adjacent its outer end the other of said shaft retaining elements being provided with a transverse recess having a wall portion diagonal in an oblique relation with the longitudinal axis of said last named shaft retaining element for thereby effecting adjacent the outermost end body portion of said last named shaft retaining element of an upturned lip directed toward the inner end of said last named shaft retaining element, the mouth of said recess opening upon the side of said last named shaft retaining element for insertion therethrough of a shaft, through their inner ends said shaft retaining elements being provided with longitudinal alined bores, the bore made in the said first named shaft retaining element being in communication with said notch, the bore made in the other of said shaft retaining elements being in communication with said recess at a point opposite of said lip, pin receivable within said bores in a transverse relation with said notch and said recess, and means for drawing the inner ends of said shaft retaining elements for effecting frictional abutment of the ends of said pin with the shafts extended through said notch and said recess, the end of said pin in abutment with the shaft extended through said recess being sufficiently wide so as to be capable in cooperation with said lip to reduce the width of said mouth for thereby preventing withdrawal of the shaft reposing within said recess as long as the frictional abutment of said pin with both shafts continues.

9. A shaft clamping device for clamping a pair of shafts, comprising a pair of oblong cylindrical members, said members being capable of assuming an end-to-end position while in an operative relation for thereby defining inner and outer ends, adjacent its outer end each of said members being provided with a transverse opening for reception therewithin of a shaft, adjacent their inner ends said members being provided with alined longitudinal bores in communication with said openings, a floating member freely positioned within said bores for a longitudinal shifting movement therewithin, an annular member normally in an encompassing relation with said members adjacent the inner ends thereof, a bevelled connection between one end of said annular member and one of said members, said bevelled connection holding said annular member and said one of said members to each other in a tight friction grip, and a threaded connection between the opposite end of said annular member and the other of said members, on imparting a rotary movement to said annular member said bevelled and threaded connections being capable of drawing the inner ends of said members towards each other for thereby causing shifting of said floating member towards the shafts reposing within said openings for bringing the former in a frictional abutment with the latter.

10. The structure defined by claim 9, wherein said bevelled connection includes an integrally formed flange upon the inner end of said first named oblong cylindrical member, the outer wall of said flange being bevelled and divergent in the direction of the inner end of said member, and said annular member being provided with a constricted mouth for defining a bevelled surface, said bevelled surface being adapted to come in contact with said bevelled wall of said flange, said bevelled surface and said bevelled wall holding said one of said members and said annular member together in a tight friction grip for movement thereof jointly as a unit relative to said other of said members.

References Cited in the file of this patent
UNITED STATES PATENTS

| | | |
|---|---|---|
| 2,433,550 | Graham | Dec. 30, 1947 |
| 2,635,345 | Samborski | Apr. 21, 1953 |
| 2,696,996 | Engelhardt | Dec. 14, 1954 |

UNITED STATES PATENT OFFICE
CERTIFICATE OF CORRECTION

Patent No. 3,118,695                          January 21, 1964

Armin E. Engelhardt

It is hereby certified that error appears in the above numbered patent requiring correction and that the said Letters Patent should read as corrected below.

Column 1, line 10, for "2,940,789" read -- 2,940,783 --.

Signed and sealed this 22nd day of December 1964.

(SEAL)
Attest:

ERNEST W. SWIDER
Attesting Officer

EDWARD J. BRENNER
Commissioner of Patents